(No Model.)
E. G. SMITH.
MACHINE FOR MAKING SCRAPED BRASS.
No. 574,226. Patented Dec. 29, 1896.
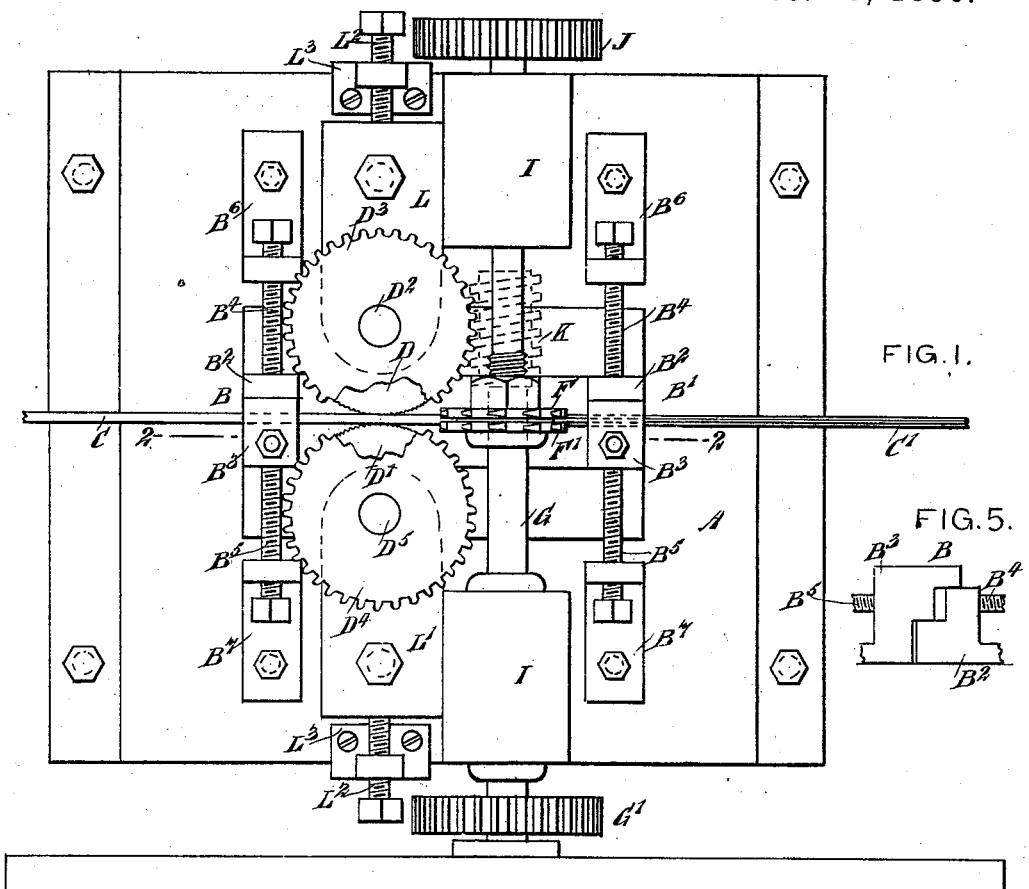
FIG. 1.
FIG. 5.
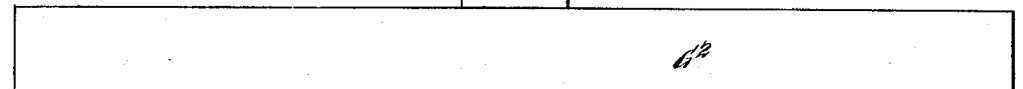
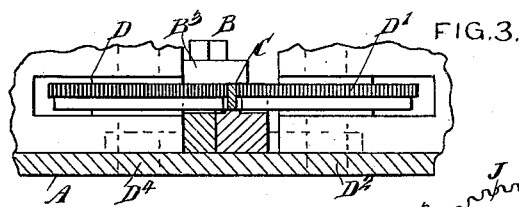
FIG. 3.
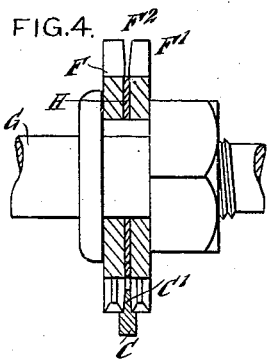
FIG. 4.
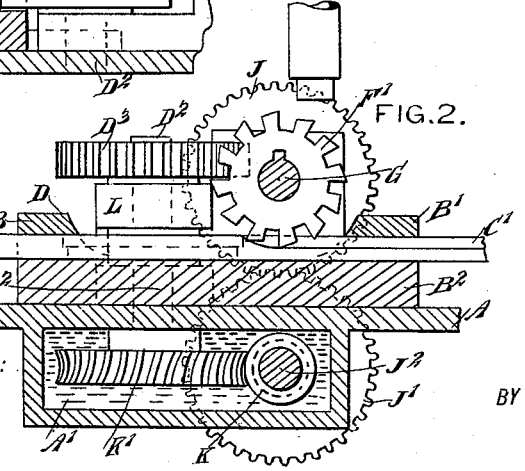
FIG. 2.
WITNESSES:
Donn Twitchell
Theo. G. Hoster
INVENTOR
E. G. Smith
BY
[signature]
ATTORNEYS.

UNITED STATES PATENT OFFICE.

EDWARD GUSTIVE SMITH, OF NEW YORK, N. Y.

MACHINE FOR MAKING SCRAPED BRASS.

SPECIFICATION forming part of Letters Patent No. 574,226, dated December 29, 1896.

Application filed September 16, 1896. Serial No. 605,971. (No model.)

*To all whom it may concern:*

Be it known that I, EDWARD GUSTIVE SMITH, of New York city, in the county and State of New York, have invented a new and Improved Machine for Making Scraped Brass, of which the following is a full, clear, and exact description.

The invention relates to metal-working machinery; and its object is to provide a new and improved machine for forming scraped brass adapted to be driven into rollers, so as to form the type for printing wall-paper.

The invention consists principally of a number of revoluble cutters separated from each other and formed with cutting-teeth having their oppositely-arranged cutting edges beveled.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a plan view of the improvement with parts broken out. Fig. 2 is a sectional side elevation of the same on the line 2 2 of Fig. 1. Fig. 3 is a transverse section of the feeding device. Fig. 4 is an enlarged cross-section of the cutters in place on the spindle, and Fig. 5 is an end elevation of the adjustable guide-block for the brass.

The improved machine is provided with a table A, on which are held the transversely-extending guide-blocks B B', for guiding the brass C through the machine. The guide-block B also forms an entrance for the bar to be formed in the brass, and next to this guide-block are arranged the horizontally-disposed feed-rollers D D', engaging the brass near the bottom thereof and on opposite sides, as plainly indicated in the drawings. Next to the feed-rollers D D' are arranged the vertically-disposed cutters F F', keyed or otherwise secured on a transversely-extending spindle G and separated from each other by a washer H, as plainly indicated in the drawings, special reference being had to Fig. 4. The cutters F F' are formed with teeth having their oppositely-arranged cutting edges beveled, so as to mill each side of the brass to form the reduced edge C', as is plainly indicated in Figs. 2 and 4.

The spindle G is mounted to rotate in suitable bearings I, held on the top of the table A, and on one end of said spindle is secured a gear-wheel G', in mesh with a like gear-wheel, rotated from suitable machinery, to impart a rotary motion to the spindle G. The latter is also provided, next to the gear-wheel G', with a fly-wheel $G^2$, and on the other end of the said spindle is secured a gear-wheel J in mesh with a gear-wheel J', secured on a transversely-extending shaft $J^2$, journaled in the ends of a box A', formed or attached to the under side of the table A and preferably filled with oil, as indicated in Fig. 2.

On the shaft $J^2$ is secured a worm K within the box A', and this worm meshes into a worm-wheel K', secured on the lower end of the shaft $D^2$, carrying the feed-roll D, engaging one side of the brass C. On the extreme upper end of this shaft $D^2$ is secured a gear-wheel $D^3$ in mesh with a like gear-wheel $D^4$, secured on the upper end of the shaft $D^5$, carrying the other feed-roll D', as plainly shown in Fig. 1.

Now it will be seen that when the spindle G is rotated a rotary motion is transmitted, by the gear-wheels J J', shaft $J^2$, worm K, and worm-wheel K', to the shaft $D^2$ to rotate the feed-roll D, and a similar motion is given to the other feed-roll D' by the gear-wheels $D^3$ $D^4$. Thus the brass C is fed forward through the guide-blocks B B', and the cutters F F' cut opposite sides of the said brass to form the edge C', as previously described.

Each of the guide-blocks B B' is made in sections, as indicated in Fig. 5. That is, each guide-block is provided with the overlapping sections $B^2$ $B^3$, engaged by transversely-extending screw-rods $B^4$ $B^5$, screwing in brackets $B^6$ $B^7$, respectively, secured to the table A. By adjusting the screws $B^4$ $B^5$ the sections $B^2$ $B^3$ may be moved farther apart or nearer together to form an opening corresponding to the cross-section of the brass under treatment.

The shafts $D^2$ $D^5$, carrying the feed-rolls D D', are journaled in transversely-adjustable bearings L L', respectively, each engaged by a screw-rod $L^2$, screwing in a suitable bracket $L^3$, secured to the table A. By adjusting the screw-rods $L^2$ the bearings, and consequently the feed-rollers, are moved toward and from each other to engage with their serrated edges the brass C, so as to feed the same forward. The serrated edges of the feed-rollers engage the brass only near the upper end thereof, so that the indentations made by the serrations are cut out by the cutters F F', and consequently the finished brass presents a very smooth surface, both at its base and sides of the edge C'. By placing a washer H of more or less thickness between the two cutters F F', I am enabled to form an edge C' of corresponding thickness.

Now it will be seen that when the machine is in operation the brass bar is properly fed through the guide-block B and feed-rollers D D' to the cutters F F', the base of the bar resting on the bottom portion of the block-section B² between the guide-rollers B B'. The cutters F F' smoothly remove the surplus stock near the upper edge of the brass, so as to leave a smooth and uniform edge C' on the top of the brass.

Having thus fully described my invention, I claim as new and desire to secure by Letters Patent—

1. The combination with a table, of a rotary shaft mounted thereon, a cutter fixed to the shaft, a second rotary shaft geared with the first shaft, two feed-disks geared with each other, a worm-wheel in connection with one of the feed-disks, a worm fixed to the said second shaft and meshed with the worm-wheel of one of the feed-disks and two guides located respectively at the front and rear of the cutters and feed-disks, the guides being formed of two longitudinally-extending blocks the ends of which have coacting portions which form the guides proper, said guides proper being longitudinally alined with the cutters and feed-disks, substantially as described.

2. The combination with a table of a rotary shaft, a cutter fixed to the rotary shaft, two feed-disks feeding to the cutter, gearing driving the feed-disks from the rotary shaft, two longitudinally-elongated guide-blocks located beneath the cutter and beneath the feed-disks the ends of the guide-blocks cooperating to form two guides respectively located at the front and rear of the cutter and feed-disks, and means for adjusting the guide-blocks transversely toward and from each other, substantially as described.

3. The combination with a table, of a rotary shaft mounted above the table, a cutter fixed to the rotary shaft, a second rotary shaft journaled beneath the table and geared with the first rotary shaft, a worm on the second rotary shaft, two vertical shafts passing through the table, a feed-disk fixed to each vertical shaft and located above the table, gearing connecting the two vertical shafts, a worm-wheel fixed to one vertical shaft and meshing with the worm on the second rotary shaft, two longitudinally-elongated guide-blocks extending beneath the feed-disks and cutter and having their ends coacting to form two guides respectively located at the front and rear of the feed-disks and cutter, and means for adjusting the guide-blocks transversely toward and from each other, substantially as described.

4. The combination with a table, of a cutter, two feed-disks coacting with the cutter, means for driving the cutter and feed-disks in unison, and two longitudinally-elongated guide-blocks running beneath the feed-disks and cutters, and extended beyond the same, the extremities of the guide-blocks coacting to form guides proper through which the work passes, substantially as described.

5. The combination with a table, of a cutter, two feed-disks coacting with the cutter, means for driving the feed-disks and cutter in unison, two longitudinally-elongated guide-blocks extending beneath the feed-disks and cutter and extending beyond the same, the extremities of the guide-blocks coacting to form guides proper through which the work passes, and a screw pressing each guide-block, the screws being in connection with the table and serving to move the guide-blocks toward and from each other, substantially as described.

EDWARD GUSTIVE SMITH.

Witnesses:
FREDK. WM. MEINKEN,
ALOIS T. COLLING.